United States Patent
Natter

(10) Patent No.: US 6,474,224 B1
(45) Date of Patent: Nov. 5, 2002

(54) SHISH KEBAB SKEWER RACK SYSTEM

(75) Inventor: Seth Natter, New York, NY (US)

(73) Assignee: Mr. Bar-B-Q, Inc., Old Bethpage, NY (US)

( * ) Notice: Subject to any disclaimer, the term of this patent is extended or adjusted under 35 U.S.C. 154(b) by 0 days.

(21) Appl. No.: 10/079,110

(22) Filed: Feb. 21, 2002

(51) Int. Cl.$^7$ .......................... A47J 37/00; A47J 37/04; A23L 1/00
(52) U.S. Cl. ....................... 99/421 A; 99/419; 99/421 H
(58) Field of Search ............... 99/339, 340, 419–421 V, 99/426, 444–450; 126/25 R, 9 R

(56) References Cited

U.S. PATENT DOCUMENTS

| | | |
|---|---|---|
| 1,377,043 A | 5/1921 | Wilson |
| 2,317,388 A | 4/1943 | Lako |
| 2,491,594 A * | 12/1949 | Williams .................. 99/419 X |
| 2,608,928 A * | 9/1952 | McDonnel ................ 99/421 A |
| 2,854,918 A | 10/1958 | Merritt |
| 2,885,950 A | 5/1959 | Stoll |
| 2,939,384 A | 6/1960 | Vinson |
| 3,017,819 A | 1/1962 | Manteris |
| 3,126,814 A | 3/1964 | Brown |
| 3,169,470 A | 2/1965 | Oatley |
| 3,297,166 A * | 1/1967 | Summers .................. 99/419 X |
| 3,309,982 A | 3/1967 | Surks |
| 3,393,630 A | 7/1968 | Pickens |
| 3,741,103 A | 6/1973 | Hwag |
| 3,848,523 A * | 11/1974 | Galisz et al. ............. 99/421 H |
| 3,858,495 A * | 1/1975 | Gotwalt .................. 99/421 HH |
| 3,939,761 A * | 2/1976 | McGinty .................. 99/421 H |
| 4,112,832 A * | 9/1978 | Severdia et al. ........ 99/421 HH |
| 4,158,991 A * | 6/1979 | Nakashima ............... 99/421 H |
| 4,583,263 A * | 4/1986 | Wigley, Jr. ................... 99/419 |
| 5,007,403 A * | 4/1991 | Chen ........................ 126/25 R |
| 5,058,493 A * | 10/1991 | Basek et al. .................. 99/339 |
| 5,168,798 A * | 12/1992 | Kristofich et al. ........ 99/421 H |
| 5,887,513 A | 3/1999 | Fielding et al. |
| 6,155,162 A * | 12/2000 | Wang ....................... 99/421 A |

* cited by examiner

Primary Examiner—Timothy F. Simone
(74) Attorney, Agent, or Firm—Natter & Natter

(57) ABSTRACT

The skewer rack system for simultaneously cooking several shish kebabs on a barbecue grill, brazier, boiler or in an oven includes a rectangular frame having a pair of opposed panels. A plurality of spaced openings for receiving the tips of skewers is formed in one panel. The other panel includes a plurality of notches in its upper edge. A portion of each skewer adjacent its end lies in a notch registered with the opening in which the tip of the skewer is received. A keeper rod is pivotally mounted at the rear of the notched panel and is rotated to bear against portions of each skewer which extend beyond the notched panel to retain the skewers in place. The keeper rod includes a proximal depending leg having an interned bight which engages the underside of the notched panel to lock the keeper rod in place. The rack may be flipped over for cooking both sides of the shish kebabs.

16 Claims, 2 Drawing Sheets

SHISH KEBAB SKEWER RACK SYSTEM

BACKGROUND OF THE INVENTION

1. Field of the Invention

This invention relates generally to cooking implements and more particularly to a rack system for holding shish kebab skewers during cooking.

2. Antecedents of the Invention

Enhanced flavor and reduced cooking time have been attributed to food items cooked on a skewer or spit. It has been known to support several skewers carrying food pieces across a pair of parallel panels during cooking. In some instances, the panels included notches for maintaining the skewers in place, as exemplified by U.S. Pat. No. 3,297,166 to SUMMER, U.S. Pat. No. 3,169,470 to OATLY, U.S. Pat. No. 3,393,630 to PICKENS and U.S. Pat. No. 5,887,513 to FIELDING.

It is also known to position multiple skewers carrying food pieces between a pair of parallel supports, one of which includes apertures for receiving the skewer tips and the other, notches. Such structures are exemplified by U.S. Pat. No. 3,126,814 to BROWN, U.S. Pat. No. 2,885,950 to STOLL and U.S. Pat. No. 1,377,043 to WILSON.

While the combination of parallel apertured and notched panels provided additional assurance against inadvertent dislodgement of the skewers during positioning or cooking, the inadvertent dislodgment of skewers from at least the notched panel remained a problem. Some proposed notch retention arrangements, such as that illustrated in U.S. Pat. No. 3,126,814, required manipulation of various elements, including, for example, butterfly nuts, which was difficult, especially when the apparatus was hot.

SUMMARY OF THE INVENTION

A shish kebab skewer rack system comprises a rectangular wire frame having a pair of parallel mullions, a distal end and an ansate proximal end. Affixed to each of the mullions is a generally planar side panel, with one side panel having apertures and the other, registered notches in its upper edge. The tips of skewers carrying raw shish kebab items to be cooked are extended through the apertures in the one panel and the skewers are positioned across the rack resting in the notches of the other panel and with an end portion of the skewers projecting beyond the notched panel.

A keeper rod is pivotally mounted at the rear of the notched panel and is rotated to bear against the skewer portions projecting beyond the notched panel. The keeper rod includes a depending forward leg having an interned bight which engages the underside of the notched panel in order to lock the keeper rod in place while maintaining downward pressure on the skewers.

From the foregoing compendium, it will be appreciated that it is an aspect of the present invention to provide a shish kebab skewer rack system of the general character described which is not subject to the disadvantages of the antecedents of the invention.

A feature of the present invention is to provide a shish kebab skewer rack system of the general character described which is low in cost.

A consideration of the present invention is to provide a shish kebab skewer rack system of the general character described which is simple to use.

Another aspect of the present invention is to provide a shish kebab skewer rack system of the general character described having a minimal number of components.

To provide a shish kebab skewer rack system of the general character described which is well suited for economical mass production fabrication is a still further consideration of the present invention.

Another feature of the present invention is to provide a shish kebab skewer rack system of the general character described which is well suited for economical mass production fabrication.

A further consideration of the present invention is to provide a shish kebab skewer rack system of the general character described which assures uniform simultaneous cooking of several shish kebabs.

A still further feature of the present invention is to provide a shish kebab skewer rack system of the general character described which is easy to manipulate.

To provide a shish kebab skewer rack system of the general character described which is maintenance free is yet a further aspect of the present invention.

Another feature of the present invention is to provide a shish kebab skewer rack system of the general character described which utilizes a single keeper rod for simultaneously retaining a plurality of skewers.

Other aspects, features and considerations of the present invention in part will be obvious and in part will be pointed out hereinafter.

With these ends in view, the invention finds embodiment in certain combinations of elements, arrangements of parts and series of steps by which the aforesaid aspects, features and considerations and certain other aspects, features and considerations are attained, or with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
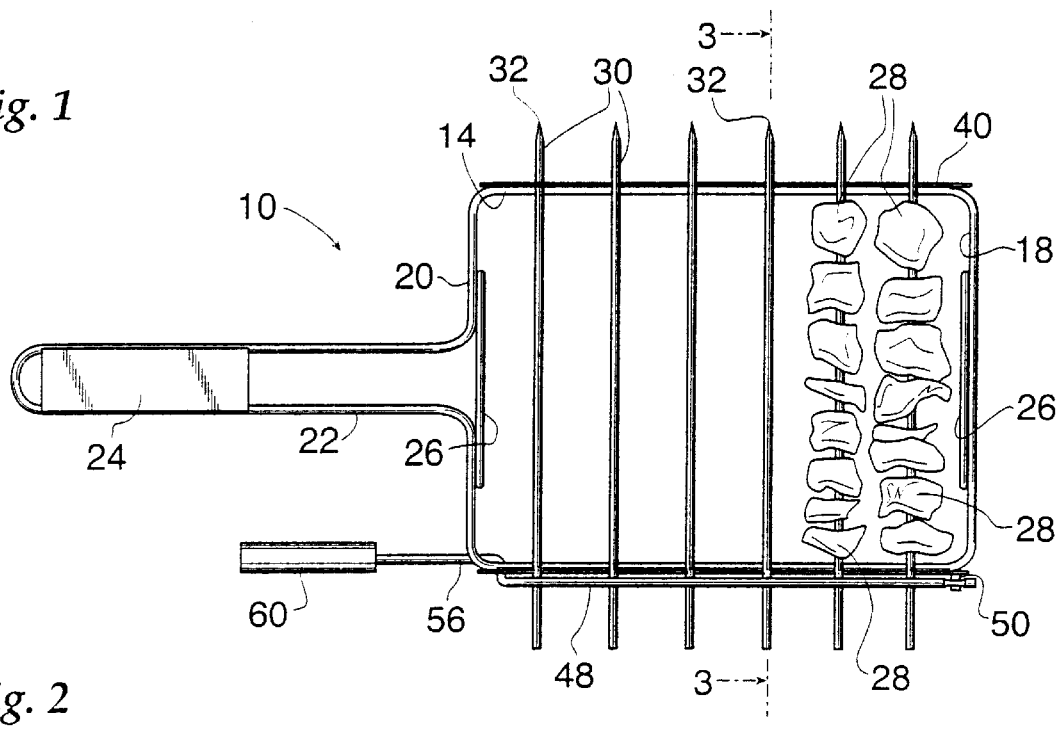
FIG. 1 is a top plan view of a shish kebab skewer rack system constructed in accordance with and embodying the invention and showing a keeper rod securing a plurality of skewers which are carried between a pair of parallel side panels.
Figure 2:
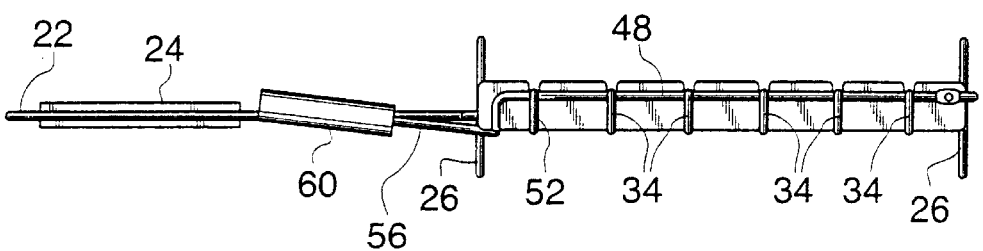
FIG. 2 is a front elevational view of the shish kebab skewer rack system showing a bight portion of the keeper rod engaged under a lower edge of a side panel.

Referring now in detail to the drawings, the reference numeral 10 denotes generally a shish kebab skewer rack system constructed in accordance with and embodying the invention. The system includes a rectangular frame 12 formed of metal rod material and including a pair of parallel mullions, 14, 16, a distal end 18 and a proximal ansate end 20. The ansate end 20 is configured with an elongate U-shaped extension 22 which may include a handle 24 formed of wood, thermoset, or other preferably non-heat conductive material.

A pair of generally planar rectangular stanchions 26 are formed of wire rod and are secured to the inner portions of the frame at the distal end 18 and proximal end 20 by spot welding, for example. The stanchions 26 lie in parallel planes which are perpendicular to the plane of the frame 12. The stanchions 26 are employed to maintain the rack system 10 at a fixed elevation above a grate 27 of a brazier, hibachi, barbecue grill or above a broiler tray or rack and at a uniform distance from a heat source, regardless of the direction in which the rack 10 is facing the heat source. Either a stanchion beam 29 or an opposite stanchion beam 31 rests against the grate 27, depending upon which direction the rack faces the heat source.

In accordance with the invention, a shish kebab array of raw chunks 28 of meat, fowl, vegetables, seafood, with or without seasoning, including any assortments, groupings and variations thereof, are impaled on a plurality of skewers 30, advantageously utilizing a pointed tip 32 of each skewer. The opposite end of each skewer 30 includes a rounded handle or grip portion 34. There is additionally formed on each skewer, at a slight distance from the handle 34, an upwardly bent section 36, which is separated from the handle portion by a span 38.

In accordance with the invention, secured to the outer edge of the mullion 14 is a rectangular sheet metal panel 40, which may be fixed to the mullion 14 by spot welding or other suitable means. Secured to the outer edge of the mullion 16 is a similar panel 44 The panels 40, 44 lie in parallel planes which are perpendicular to the plane of the frame 12 and to the planes of the stanchions 26.

Figure 3:
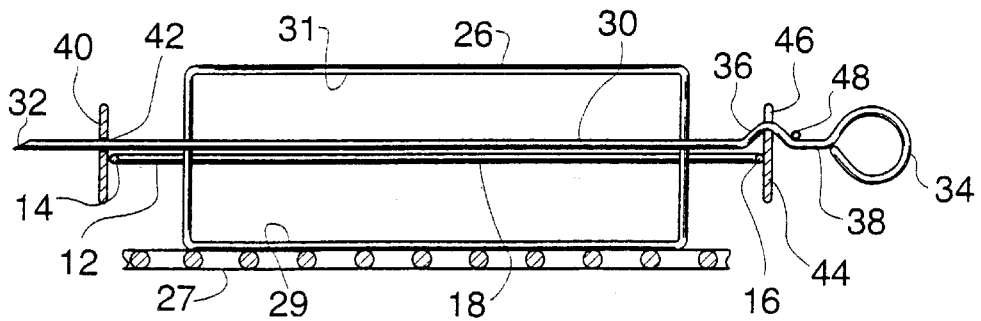
FIG. 3 is an enlarged scale sectional view through the shish kebab skewer rack system, the same being taken substantially along the line 3—3 of FIG. 1, with portions deleted for clarity, and showing a rack frame and a skewer tip extending through a hole in one side panel and an apex of a bend in a skewer resting at the bottom of a notch formed in the other side panel; also shown is a keeper rod bearing against a portion of the skewer which extends beyond the notched panel.
Figure 4:
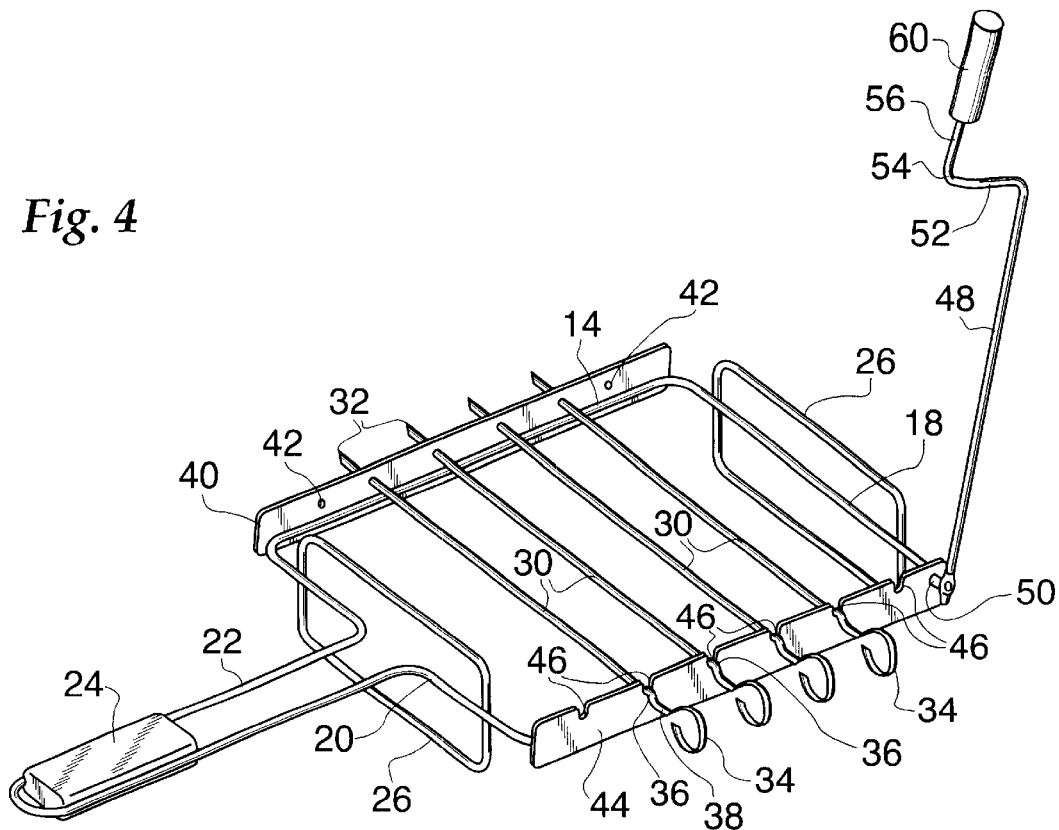
FIG. 4 is a perspective view of the shish kebab skewer rack system with the keeper rod in an open position to enable loading or removal of skewers.

As will be noted from an examination of FIG. 3 and FIG. 4, the panel 40 includes a plurality of equidistantly spaced apertures or holes 42, dimensioned to receive the pointed tip 32 and shaft of a skewer 30. In the opposite panel 44, a plurality of equidistantly spaced notches 46 extend downwardly from an upper edge of the panel.

In use, after placing the raw shish kebab food chunks 28 on a skewer 30, the tip 32 of the skewer is inserted through an opening 42 in the panel 40 and the skewer is pivoted downwardly such that an apex of the bent section 36 engages the bottom of a notch 46, as can be seen in FIG. 3. The parallel mullions 14, 16 define the boundaries of a cooking zone within which the shish kebab chunks 28 are contained.

After the desired number of skewers laden with raw shish kebab food chunks 28 have been similarly supported across the openings 42 and notches 46 of the side panels 40, 44, an elongate keeper rod 48 is employed to maintain the skewers fixed in position during subsequent cooking of the shish kebab food chunks 28. The keeper rod 48 functions to exert a force urging the apex of the bent sections 36 of the skewers against the bottoms of the notches 46.

The keeper rod 48 is preferably formed of a suitable metal and is pivotally mounted to and spaced from the outer face of the panel 44 adjacent its distal edge at a lug 50. The keeper rod is rotated in a counterclockwise direction (as viewed in FIG. 4) to a final operative position, wherein it bears downwardly against the span 38 of each skewer 30.

Figure 5:
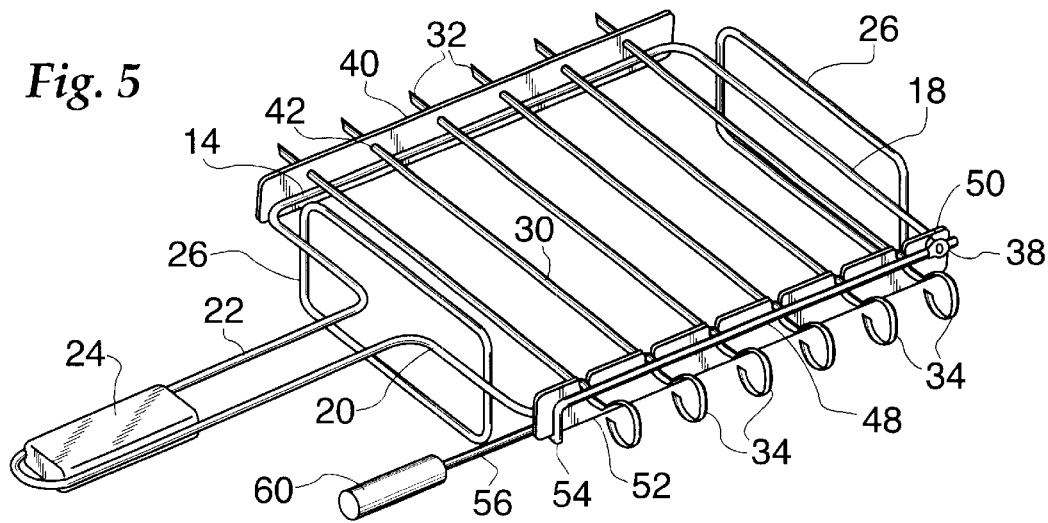
FIG. 5 is a perspective view of the shish kebab skewer rack system, similar to FIG. 4, yet showing the keeper rod in a locked position, maintaining the skewers fixed between the side panels.

In order to maintain the keeper rod 48 in its FIG. 5 operative position, the keeper rod 48 includes, adjacent its proximal end, a depending leg 52 having a laterally interned bight 54 which extends under the lower edge of the side panel 44 and across a portion of the inner face of the side panel 44. From the bight 54, an arm 56 of the keeper rod 48 extends forwardly in a plane parallel to the plane of the mullion 16 and terminates at a handle 60.

Various alternate arrangements may be provided for maintaining the keeper rod in operative position, bearing down against the span 38 of each skewer. For example, the keeper rod may be straight and may be engaged, adjacent its proximal end, under a tab or stop which projects outwardly from the side panel 44, adjacent its proximal end.

It should be appreciated that the keeper rod 48 is simple to manipulate, with the user grasping the frame handle 24 in the user's left hand and a the keeper rod handle 60 in the user's right hand. To disengage the keeper rod, for example, while the user's left hand stabilizes the frame 12, the handle 60 is moved downwardly to clear the bottom edge of the side panel 44 and then toward the right as viewed in FIG. 5, until the bight 54 and arm 56 are laterally spaced from the outer face of the side panel 44. The keeper end 48 is then rotated clockwise, to its FIG. 4 position. Skewers laden with raw shish kebab chunks 28 may then be positioned between the side panels 40, 42 or skewers with cooked shish kebab chunks may be removed.

With the keeper rod 48 in its operative FIG. 5 position, and the skewers laden with raw shish kebab chunks 28 in the cooking zone, the rack system 10 is placed upon a brazier or barbecue grill grate 27, or on a broiler tray, with the stanchion beam 29 of each stanchion 26 resting upon the grate or tray 27. After the sides of the chunks 28 facing the heat source have been cooked, the rack is turned over so that the stanchion beam 31 of each stanchion rests on the grate or tray 27 with the uncooked sides of the chunks 28 facing the heat source to completely cook the shish kebab chunks 28.

Thus is will be seen that there is provided a shish kebab skewer rack system of the general character described which achieves the various aspects, features and considerations of the present invention and is well suited to meet the conditions of practical usage.

As various changes might be made in the illustrative embodiment herein disclosed without departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A shish kebab skewer rack system for cooking skewered shish kebabs, the rack system comprising a frame having a first skewer support member and a second skewer support member, the skewer support members being parallel to one another, a plurality of apertures formed in the first skewer support member, a like plurality of notches formed in an upper edge of the second skewer support member, at least one skewer, the skewer having a length greater than the distance between the members, the skewer having a tip at one end, the tip being received in one of the apertures, a portion of the skewer adjacent the other end of the skewer resting against a bottom of a notch registered with the one aperture, the skewer being configured to impale a plurality of shish kebab food chunks to be cooked and carry the chunks between the skewer support members, a keeper rod, the keeper rod having a proximal end and a distal end, the keeper rod being pivotally mounted to the second skewer support member adjacent the distal end of the keeper rod and being rotatable to an operative position, wherein the keeper rod bears against the skewer and exerts a force urging the portion of the skewer against the bottom of the notch within which it is resting, a portion of the keeper rod adjacent the proximal end being in selective engagement with the second skewer support member to maintain the keeper rod in operative position.

2. A shish kebab skewer rack system as constructed in accordance with claim 1 further including a group of skewers, each skewer having a tip at one end, the tips being received in an aperture and a portion of each skewer adjacent the other end of the skewer resting against a bottom of a notch registered with the aperture within which the respective tip is received, the keeper rod bearing against each of the skewers and exerting a force urging the portion of each skewer against the bottom of the notch within which it is received when the keeper rod is in the operative position.

3. A shish kebab skewer rack system as constructed in accordance with claim 1 wherein the first skewer support member and the second skewer support member comprise panels.

4. A shish kebab skewer rack system as constructed in accordance with claim 3, a further portion of the skewer extending from the notch and beyond an outer face of the second panel, the keeper rod bearing against the further portion of the skewer.

5. A shish kebab skewer rack system as constructed in accordance with claim 1 wherein the portion of the keeper rod in selective engagement with the second skewer support member includes a depending leg terminating at a bight, the bight being in selective engagement with a lower edge surface of the second skewer support member.

6. A shish kebab skewer rack system as constructed in accordance with claim 5 wherein the proximal end of the keeper rod comprises an arm, the arm extending from the bight, the arm including a handle for manipulating the keeper rod into and out of selective engagement with the second skewer support member.

7. A shish kebab skewer rack system as constructed in accordance with claim 1 wherein the frame includes a distal end, a proximal end and a pair of mullions, the first skewer support member being fixed to one mullion and the second skewer support member being fixed to the other mullion.

8. A shish kebab skewer rack system as constructed in accordance with claim 7 further including a stanchion fixed to the distal end of the frame and a further stanchion fixed to the proximal end of the frame, the stanchions for supporting the shish kebabs skewer rack system at a distance from a heat source, the frame lying substantially within a plane, the stanchions lying within planes perpendicular to the plane of the frame, each stanchion extending an equal distance above and below the plane of the frame whereby the shish kebab skewer rack system is maintained at a uniform distance from a heat source, after the rack has been flipped to cook the opposite sides of the food chunks.

9. A shish kebab skewer rack system as constructed in accordance with claim 3 wherein the frame is formed of wire rod having a pair mullions, the first skewer support member being fixed to one mullion and the second skewer support member being fixed to the other mullion, the panels lying in parallel planes, the frame lying substantially in a plane transverse to the planes of the panels.

10. A shish kebab skewer rack system as constructed in accordance with claim 3 wherein the frame includes a distal end and an ansate proximal end, a frame handle extending forwardly from the proximal end, a handle at the proximal end of the keeper rod, the frame handle and the keeper rod handle being substantially parallel to one another when the keeper rod is in its operative position.

11. A method of operating a shish kebab skewer rack system as constructed in accordance with claim 10, the method comprising the steps of:
 a) steadying the frame by grasping the frame handle in one's left hand and holding the frame handle substantially immobile; and
 b) manipulating the keeper rod into or out of its operative position by grasping the keeper rod handle in one's right hand, and urging the handle laterally.

12. A method of operating a shish kebab skewer rack system as constructed in accordance with claim 10 wherein step b) comprises manipulating the keeper rod out of its operative position, the method further including:
 c) rotating the keeper rod away from the proximal end of the frame, whereby the rack system is accessible for removal of the skewer carrying cooked shish kebab food chunks and/or the positioning of at least a further skewer in engagement with the first panel and the second panel, the further skewer carrying a plurality of shish kebab food chunks to be cooked.

13. A shish kebab skewer rack system for cooking skewered shish kebabs, the rack system comprising a frame having a first panel and a second panel, the panels being parallel to one another, a plurality of apertures formed in the first panel, a like plurality of notches formed in an upper edge of the second panel, at least one skewer, the skewer having a length greater than the distance between the panels, the skewer having a tip at one end, the tip being received in one of the apertures, a portion of the skewer adjacent the other end of the skewer resting against a bottom of a notch registered with the one aperture, the skewer being configured to impale a plurality of shish kebab food chunks to be cooked and to carry the chunks between the panels, a keeper rod, the keeper rod being pivotally mounted to the second panel at a location spaced rearwardly from the most rearward notch, the keeper rod being rotatable to an operative position wherein the keeper rod bears against the skewer and exerts a force urging the portion of the skewer against the bottom of the notch within which it is resting, a portion of the keeper rod adjacent the proximal end including a bight, the bight being in selective engagement with a lower edge of the second panel to maintain the keeper rod in the operative position.

14. A shish kebab skewer rack system as constructed in accordance with claim 13 further including a group of skewers, each skewer having a tip at one end, each tip being received in an aperture, a portion of each skewer adjacent the other end of each skewer resting against a bottom of a notch registered with the aperture within which the respective tip is received, the keeper rod bearing against each of the skewers and exerting a force urging the portion of each skewer against the bottom of the notch within which it is received when the keeper rod is in the operative position.

15. A shish kebab skewer rack system as constructed in accordance with claim 13, wherein a further portion of the skewer extends from the notch beyond an outer face of the second panel, the keeper rod bearing against the further portion of the skewer.

16. A shish kebab skewer rack system as constructed in accordance with claim 13 wherein the frame includes a distal end, a proximal end and a pair of mullions, the first panel being fixed to one mullion and the second panel being fixed to the other mullion.

\* \* \* \* \*